United States Patent [19]

Watabe et al.

[11] Patent Number: 4,490,621

[45] Date of Patent: Dec. 25, 1984

[54] METHOD AND APPARATUS FOR GENERATING ELECTRIC POWER BY WAVES

[75] Inventors: Tomiji Watabe, Noboribetsu; Hideo Kondo, Muroran; Toshihiko Matsuda, Muroran; Kenji Yano, Muroran; Yasuhiko Dote, Muroran; Matao Takagi, Suita, all of Japan

[73] Assignee: Muroran Institute of Technology, Muroran, Japan

[21] Appl. No.: 485,518

[22] Filed: Apr. 14, 1983

[30] Foreign Application Priority Data

Apr. 14, 1982 [JP] Japan ................... 57-60869

[51] Int. Cl.³ ........................... F03B 13/12
[52] U.S. Cl. ........................... 290/42; 290/43; 290/52; 290/53; 417/330; 417/332; 60/497; 415/5; 91/5
[58] Field of Search .............. 290/42, 43, 44, 52, 290/53, 54, 4; 417/330, 331, 332, 333, 334; 60/495-507; 91/5, 532, 534, 509, 513-525, 533, 536; 415/5

[56] References Cited

U.S. PATENT DOCUMENTS

| 692,396 | 2/1902 | Wilcox | 417/330 |
|---|---|---|---|
| 901,117 | 10/1908 | McManus | 290/53 X |
| 988,508 | 4/1911 | Reynolds | 290/42 X |
| 1,018,678 | 2/1912 | Nelson | 290/4 D |
| 1,449,426 | 3/1923 | Loveless et al. | 415/5 |
| 1,887,316 | 11/1932 | Lockfaw | 417/330 |
| 3,515,889 | 6/1970 | Kammerer | 290/53 |
| 4,098,084 | 7/1978 | Cockerell | 417/332 X |
| 4,115,034 | 9/1978 | Smith | 417/332 X |
| 4,204,406 | 5/1980 | Hopfe | 60/497 X |
| 4,210,821 | 7/1980 | Cockerell | 290/53 |
| 4,400,940 | 8/1983 | Watabe et al. | 417/330 X |

FOREIGN PATENT DOCUMENTS

| 1541571 | 3/1979 | United Kingdom . |
| 1573428 | 8/1980 | United Kingdom . |

Primary Examiner—J. V. Truhe
Assistant Examiner—Paul Shik Luen Ip
Attorney, Agent, or Firm—Spencer & Frank

[57] ABSTRACT

At least one caisson which is part or all of a breakwater forms a water chamber therein whose closure is a pendulum having a natural period in rocking or oscillating the same as a period of stationary wave surges caused in the water chamber by rocking movement of the pendulum owing to wave force impinging against the pendulum. At least one double-acting piston and cylinder assembly is connected to the pendulum, so that when a piston of the assembly is reciprocatively moved by the pendulum, pressure difference between cylinder chambers on both sides of the piston of the assembly controls a change-over valve which in turn controls hydraulic pressure discharged from the cylinder chambers to be supplied to a plurality of hydraulic motors respectively having accumulators of a type wherein accumulated pressure and volume of the hydraulic liquid are proportional to each other, whereby driving a common generator alternately by the hydraulic motors.

7 Claims, 9 Drawing Figures

Characteristic of Generated Output

FIG_4

METHOD AND APPARATUS FOR GENERATING ELECTRIC POWER BY WAVES

BACKGROUND OF THE INVENTION

1. Field of the Invention

This invention relates to a method and an apparatus for generating electric power by wave force of water.

2. Description of the Prior Art

The inventors of this application had completed an invention of wave power generation and filed it in Japan (Japanese Patent Application No. 26,725/80, Japanese Laid-open Patent Application No. 56-124,680). Thereafter, the inventors had improved and developed the filed invention to file it (Japanese Patent Application No. 22,883/81, Japanese Laid-open Patent Application No. 57-137,655) which provides a method and an apparatus for generating power by wave force with low construction and maintenance cost for effectively generating electric power and synchronously inputting the generated power into the public electric power system. This invention has been further improved and developed by the inventors to complete the invention of the present application.

The invention disclosed in the Japanese Laid-open Patent Application No. 57-137,655 comprises a series of caissons 1 each including a bottom plate 5, a back plate 4 and sidewalls 2 and 3, opening on an opposite side of the back plate and all or part of the upper portion of the caisson as shown in FIGS. 1 and 2. The plurality of the caissons 1 are arranged side by side adjacent to each other to form all or part of a breakwater or bank at a seashore with their open ends facing to the sea. A length Bc of a water chamber in the caisson 1 is substantially equal to one fourth of wave length Lc in the water chamber to produce stationary wave surges in the water chamber, whose wave forms have points of inflection at the location one fourth of the length Lc from the back plate means on the side of the sea. The point of inflection means that where the wave form changes from under to above an average water surface or vice versa. A length of the caisson is of course larger than one fourth of the wave length Lc. A pendulum 7 having a natural period Tp in rocking or oscillating, which is substantially the same as a period Tw of the stationary wave surges, is located at the point of inflection. In this manner, the pendulum 7 is rocked or oscillated by the stationary wave surges so as to transmit the rocking movement of the pendulum to hydraulic motors or cylinders 10 which deliver the hydraulic liquid to drive a hydraulic motor 21 which in turn drives a generator 23 at a constant speed (FIG. 2).

Referring to FIG. 2, each the hydraulic cylinder 10 is supplied with the hydraulic liquid from a reservoir 11 through a line 12, flow rectifier valve means 13 and lines 14 and 15. When the pendulum 7 is rocked or oscillated by the wave force, the hydraulic liquid supplied into the left and right sides of a piston 10a of the each hydraulic cylinder 10 is alternately introduced into the hydraulic motor 21 through a line 16, a reducing valve 20 and a line 26 including an accumulator 25. A flywheel 22 is interposed between the hydraulic motor 21 and the generator 23. A relief valve 24 is provided between the line 16 and a returning line 19 connecting the hydraulic motor 21 to the reservoir 11.

With this arrangement, all the components which require maintenance such as bearings 9 are not in the water, and the entire system is very simple in construction and is connected to the public electric power network to operate with high efficiency.

An energy L per unit time of the hydraulic liquid delivered from the hydraulic cylinders 10 is indicated by a product of hydraulic pressure P and delivered flow rate Q as follows.

$$L = PQ \tag{1}$$

When the pendulum 7 rocks or oscillates according to a sine wave and the hydraulic pressure P is controlled so as to be in proportion to the rocking velocity $|\dot{\theta}|$ of the pendulum 7, the energy L is indicated as in the following equation:

$$P = Kp|\dot{\theta}| \tag{2}$$

because $$Q = Kc|\dot{\theta}| \tag{3}$$

hence $$L = KpKc\dot{\theta}^2 \tag{4}$$

where Kp and Kc are proportional constants, respectively. In other words, if $\theta = \theta_0 \sin \omega t$, the energy L is again indicated in the following other equation, where $\theta$ is an rocking angle of the pendulum 7, the maximum rocking angle $\theta_0$, an angular velocity $\omega$ of the rocking movement and time t.

$$\dot{\theta} = \theta_0 \omega \cos \omega t \tag{5}$$

hence $$L = KpKc(\theta_0\omega)^2 \cos^2 \omega t \tag{6}$$

From the equation (6), it is evident that the energy L periodically changes (refer to characteristic of generated output in FIG. 3). It may cause undesirable phenomena such as the electric voltage fluctuation or the like, if the output is directly connected to the public power network.

SUMMARY OF THE INVENTION

It is a primary object of the invention to provide an improved method and an apparatus for generating electric power by wave force, which eliminate the periodic fluctuation of the output due to the periodic variation in wave energy.

It is still more specific object of the invention to provide an improved method and an apparatus for generating electric power by waves, capable of maintaining the electric power generating efficiency at high levels over a wide range from high to low waves.

A method of generating electric power by wave force according to the invention comprises steps of transmitting movement of a wave receiving body driven by said wave force to a piston and cylinder assembly to produce hydraulic pulsation flow, and supplying said hydraulic pulsation flow in synchronism with rocking movement of said wave receiving body caused by said wave force successively into a plurality of hydraulic motors having respective accumulators connected thereto of a type wherein accumulated pressure and volume of the hydraulic flow are proportional to each other to drive one common generator through respective one-way clutches, while closing lines of the hydraulic motors which are not supplied with the flow, thereby eliminating periodic fluctuations of generated power output due to periodicity of wave energy and maintaining high wave activated power generation efficiency notwithstanding unevenness of wave heights.

In another aspect of the invention an apparatus for generating power by wave force including at least one caisson having a bottom plate, a back plate and sidewalls opening in an opposite side of said back plate and opening at least part of an upper portion of the caisson to form therein a water chamber, said caisson being arranged to form at least part of a breakwater, bank and the like facing to the sea, and a pendulum having a natural period in rocking substantially the same as periods of stationary wave surges of water caused in said water chamber and arranged in said caisson at a distance from said back plate one fourth of lengths of said stationary wave surges which rock said pendulum so as to absorb wave energy to convert it into electric or heat energy, comprises at least one double acting hydraulic piston and cylinder assembly whose piston is driven by said pendulum to discharge hydraulic liquid in extending and retracting said piston, a change-over valve actuated by pressure difference between cylinder chambers on both sides of said piston of said piston and cylinder assembly, a plurality of hydraulic motors driven by hydraulic liquid controlled by the actuation of said change-over valve to drive a common generator, and accumulators each provided in a line connecting said change-over valve and each said hydraulic motor, thereby generating electric power with the least fluctuation notwithstanding variation in wave force.

In order that the invention may be more clearly understood, preferred embodiments will be described, by way of example, with reference to the accompanying drawings.

DETAILED DESCRIPTION OF THE PREFERRED EMBODIMENT

Figure 1:
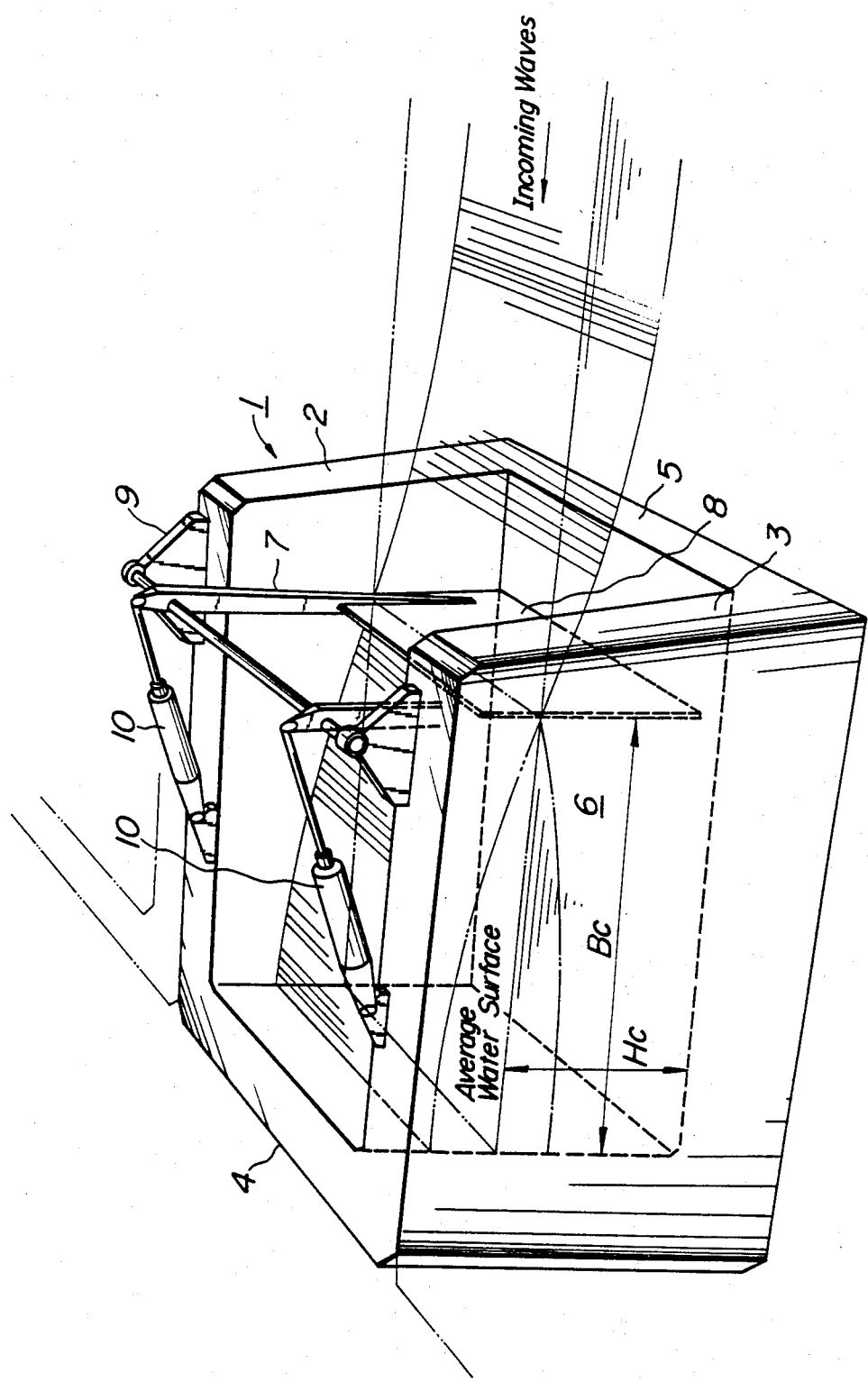
FIG. 1 is a schematic perspective view of the wave energy conversion apparatus of the prior art developed by the inventors of this application.
Figure 4:
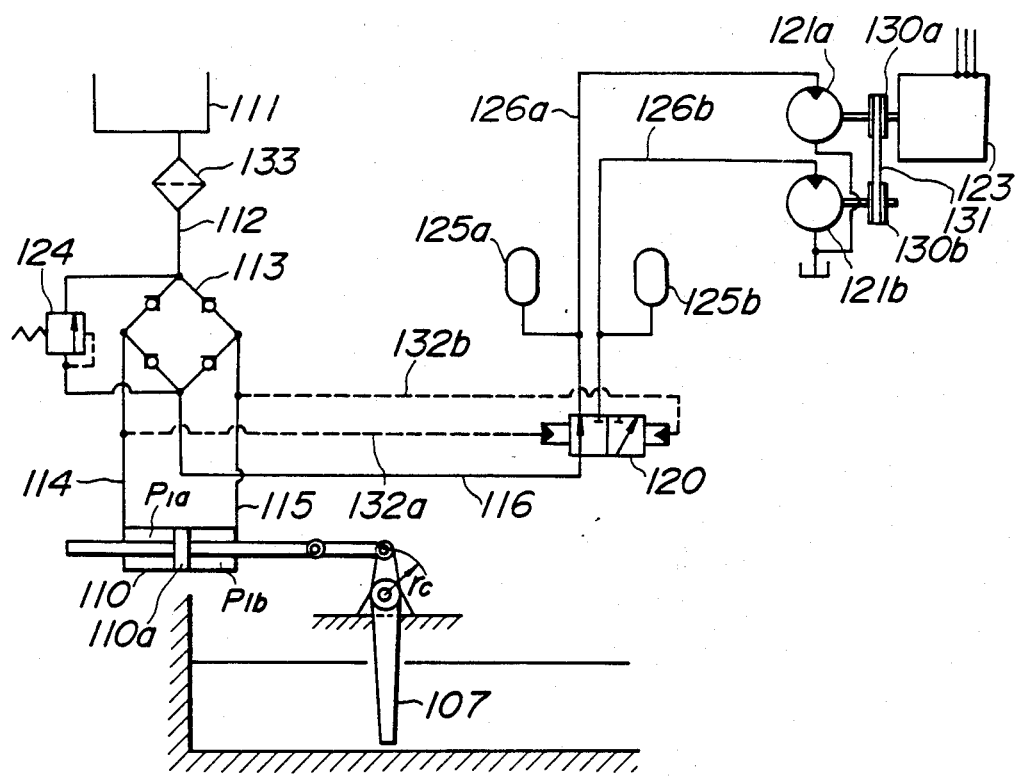
FIG. 4 is a schematic hydraulic circuit for an apparatus according to the invention.

Referring to FIG. 4, a pendulum 107 is driven by wave power according to the principle the same as in the plant shown in FIG. 1 to transmit the rocking movement of the pendulum to two hydraulic cylinders 110 (only one shown in FIG. 4). The hydraulic cylinder 110 is supplied with hydraulic liquid from a reservoir 111 through a filter 133, a line 112, flow rectifier valve means 113 and a line 114 or 115. The supplied hydraulic liquid in the cylinder 110 is discharged through the line 115 or 114 and the flow rectifier valve means to a line 116 on a higher pressure side of the circuit. In this embodiment, the flow rectifier valve means comprises four check valves.

The high pressure line 116 is connected to a change-over valve 120 which supply the hydraulic liquid from the cylinder 110 to a hydraulic motor 121a or 121b. For this purpose, hydraulic pressures $P_{1a}$ and $P_{1b}$ in a left and a right chamber of the cylinder 110 on both sides of a piston 110a are introduced through pilot ducts 132a and 132b into the change-over valve 120, so that the difference between the hydraulic pressures $P_{1a}$ and $P_{1b}$ is used as a pilot pressure to operate the change-over valve 120. When $P_{1a} > P_{1b}$, the discharged liquid from the cylinder 110 is supplied to the hydraulic motor 121a, while if $P_{1a} < P_{1b}$, it is supplied to the hydraulic motor 121b.

Figure 5:
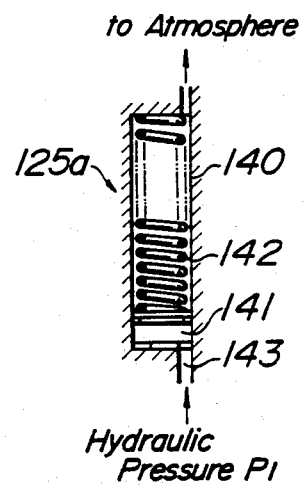
FIG. 5 is a sectional view of an accumulator preferably used for the apparatus according to the invention.
Figure 6:
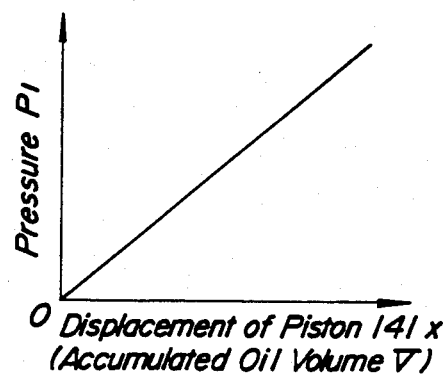
FIG. 6 is a graph illustrating an operating characteristic of the accumulator shown in FIG. 5.

One of outlet ports of the change-over valve 120 is connected to the hydraulic motor 121a through a line 126a including an accumulator 125a, while the other output port is connected to the hydraulic motor 121b through a line 126b including an accumulator 125b. These accumulators may be various kinds in which the volume V of accumulated hydraulic liquid and accumulated pressure $P_1$ are proportional to each other. A typical example of such accumulators is shown in FIG. 5 and its operating characteristic is illustrated in FIG. 6. The accumulator 125a shown in FIG. 5 comprises a housing 140 including therein a spring 142 and a piston 141. The hydraulic pressure supplied into an inlet 143 urges the piston 141 against a force of the spring to accumulate or store the hydraulic liquid in the housing on the inlet side of the piston. The spring force gradually urges the piston to discharge the liquid through the inlet 143 when the spring force overcomes the pressure in the housing.

Both the hydraulic motors 121a and 121b drive a generator 123 which is an AC synchronous or induction motor. A rotor of the generator rotates at a synchronous speed regardless of fluctuations in driving torque of the hydraulic motors because the generator is connected to the public power network. The hydraulic motor 121a drives the generator 123 through a one-way clutch built in a pulley 130a, while the hydraulic motor 121b drives the generator 123 through a one-way clutch built in a pulley 130b. A belt 131 extends about the pulleys 130a and 130b. With this arrangement, the hydraulic motors drive the generator, but the generator does not absolutely drive the hydraulic motors. Therefore, the pendulum 107 is not driven by power from the public power network.

The apparatus according to the invention operates as follows.

Referring to FIG. 4, the pendulum 107 is rocked or oscillated by the wave force to drive a piston 110a of the cylinder 110. When the piston 110a moves to the left as viewed in FIG. 4, the pressure $P_{1a}$ on the left side of the piston 110a is higher than the pressure $P_{1b}$ on the right side of the piston, or $P_{1a} > P_{1b}$, so that the hydraulic liquid from the cylinder 110 flows through the change-over valve 120 into the hydraulic motor 121a and simultaneously into the accumulator 125a to drive the generator 123.

When the piston 110a moves to the right as viewed in FIG. 4, the pressure $P_{1a}$ is lower than $P_{1b}$ or $P_{1a} < P_{1b}$, so that the hydraulic liquid from the cylinder 110 flows into the hydraulic motor 121b and the accumulator 125b. During such a flowing of the liquid, the hydraulic motor 121b drives the generator 123 in place of the hydraulic motor 121a. However, the hydraulic motor 121a also continues to drive the generator while the liquid stored in the accumulator 125a is being discharged.

When the piston 110a starts to move to the left as viewed in FIG. 4, the hydraulic motor 121a drives the generator 123. In the same manner as above described, however, the hydraulic motor 121b continues to drive the generator 123, while the hydraulic liquid stored in the accumulator 125b is being discharged.

This operation will be explained in more detail with reference to FIGS. 7-9.

Figure 7:
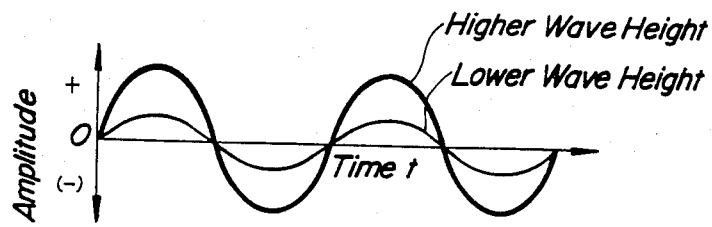
FIG. 7 is a graph of a characteristic curve illustrating a relation between time and amplitude of a pendulum used for the apparatus according to the invention.

FIG. 7 illustrates amplitudes of the pendulum 107 rocking in sine curves with respect to time. The higher the wave heights, the larger are their rocking or driving forces acting upon the pendulum and hence amplitudes of the pendulum.

Figure 8:
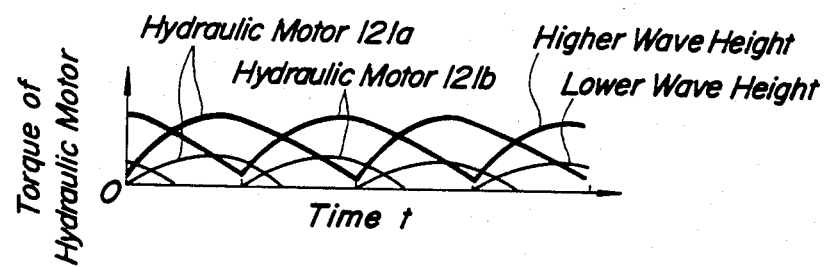
FIG. 8 is a graph of a characteristic curve showing a relation between time and torque of a hydraulic motor used for the apparatus according to the invention.

FIG. 8 illustrates torques of output shafts of the hydraulic motors 121a and 121b. The torque T of the hydraulic motor is indicated by the following equation:

$$T = \frac{P_1 D}{2\pi} \eta_t \quad (7)$$

where $P_1$ is the liquid pressure applied in the hydraulic motor which is now equal to the pressure in the accumulator, D is a displacement volume of the hydraulic motor, which is constant, and $\eta_t$ is torque efficiency.

Accordingly, the torque T is proportional to the hydraulic pressure $P_1$ under a condition capable of assuming the torque efficiency $\eta_t$ to be constant. The hydraulic motor operates to produce the torque during receiving the hydraulic liquid from the cylinder 110 and thereafter continues to operate to produce the torque during the continuous discharging of the hydraulic liquid from the accumulator. In this manner, the two hydraulic motors alternately produce the periodically changing torques. The higher the wave heights, the larger are the torques and the longer is the time for producing the torque by the rotating hydraulic motor. Within a range of the wave height higher than a determined value, the torque derived from one of the hydraulic motor starts to increase before the torque form the other hydraulic motor has lowered to zero.

Figure 2:
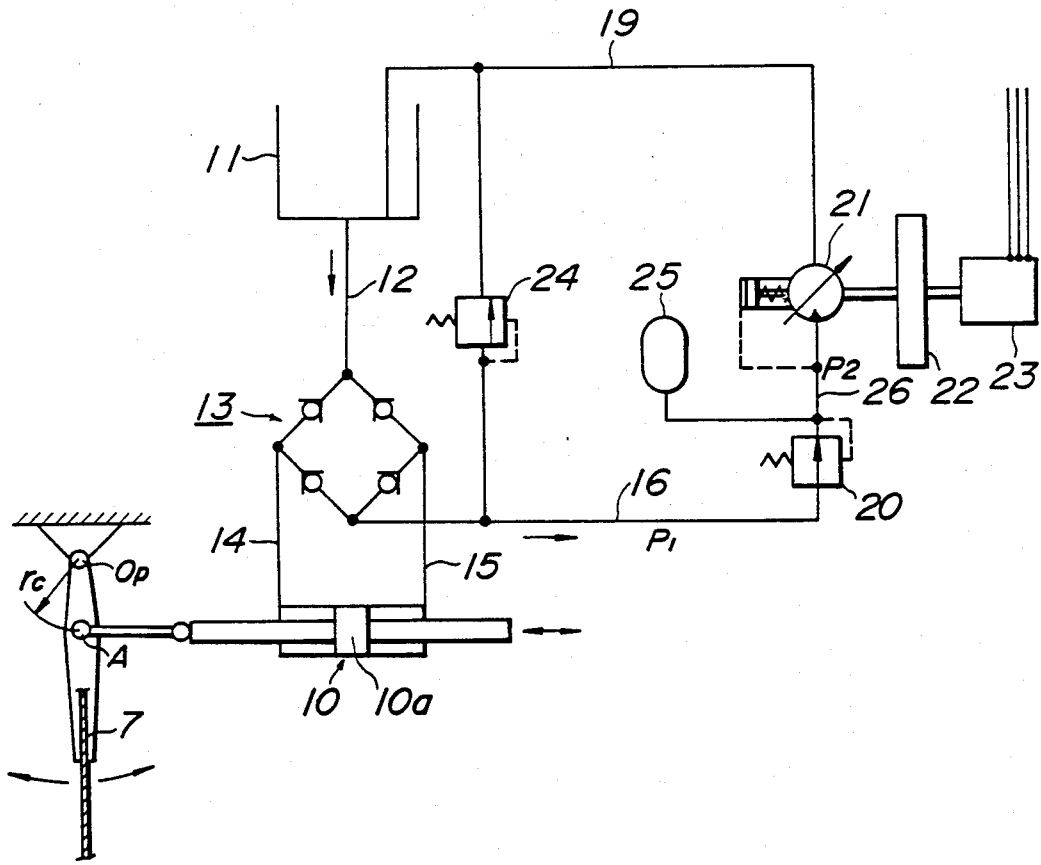
FIG. 2 is a schematic hydraulic circuit for the apparatus shown in FIG. 1.
Figure 3:
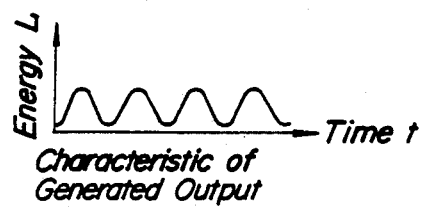
FIG. 3 is a graph illustrating a characteristic of generated output by the apparatus shown in FIGS. 1 and 2.
Figure 9:
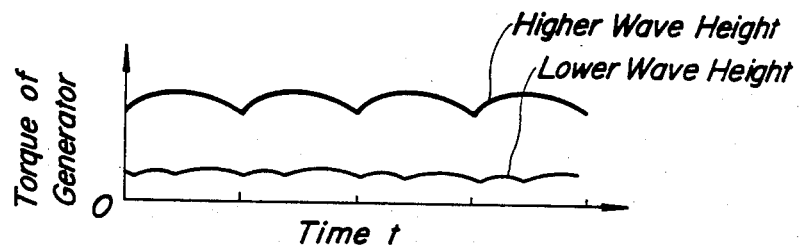
FIG. 9 is a graph of a characteristic curve illustrating a relation between time and torque of a generator used in the apparatus according to the invention.

FIG. 9 illustrates the torque acting on a shaft of the generator, which is the sum of the driving torques of the two hydraulic motors. Even if the torques from the respective hydraulic motors considerably change, the sum of torques exhibits small fluctuations. This means a remarkable improvement of the invention in comparison with the prior art shown in FIG. 2. Moreover, as the torque shown in FIG. 9 is in proportion to the output of the generator at a constant rotating speed, the torque can regarded as the output of the generator.

On the other hand, the energy W per unit time of the wave impinging against the pendulum is given by $$W = \tfrac{1}{8} \rho g H^2 C_g \quad (8)$$

where
$\rho$: density of sea water
g: gravitational acceleration
H: wave height
$C_g$: velocity of wave group.

Moreover, the energy Ea stored in the accumulator shown in FIG. 5 is given by $$Ea = \tfrac{1}{2} BV^2 = \frac{P_1^2}{2B} \quad (9)$$

where B is a proportional constant which is in the relation of an equation (10), where V is a volume of the liquid stored in the accumulator.

$$P_1 = BV \quad (10)$$

As can be seen from the equation (8), the energy W of the wave is proportional to the square of the wave height H which always changes depending upon weather conditions and other factors.

Part of the energy of the waves absorbed by the pendulum during its one stroke is stored in the accumulators 125a and 125b. The stored amount of energy in the accumulator is proportional to the square of the volume V of the stored liquid or the square of the hydraulic pressure $P_1$ as indicated by the equation (9). Accordingly, even if the energy of the waves changes greatly owing to large variation in wave height, the hydraulic energy corresponding to the energy of the waves can be absorbed so long as the accumulators receive from the cylinder 110 a volume or a pressure $P_1$ of the liquid proportional to the wave height. The fluctuations of natural wave energy are very large. How to meet such fluctuations is in fact an important problem for wave power plants. This invention practically solves this problem effectively.

In view of the characteristic of the waves, it is seldom if ever for the pendulum to be regularly rocked or oscillated by waves of the same height. With waves included in swells, heights of waves impinging against the pendulum increase and decrease repeatedly with the swells. It is in practice necessary to absorb the energy of the waves with high efficiency corresponding to the variation in wave height or to the magnitude of wave energy every wave height.

According to the invention, loads acting upon the pendulum 107 from the cylinder 110 are given by the hydraulic pressures $P_{1a}$ and $P_{1b}$ caused when the cylinder 110 is connected with the accumulators. As the accumulators are alternately switched over, the piston 110a of the cylinder 110 starts to move to the right or left under the least loaded condition. It is therefore easy to absorb the energy corresponding to the magnitude of the wave energy regardless of the magnitude. Such an absorption cannot be achieved by the apparatus of the prior art shown in FIG. 2, because if a much higher wave impinges against the pendulum to feed a great amount of hydraulic liquid into one of the hydraulic motors and the part of the liquid into its accumulator and thereafter a much lower wave comes against the pendulum when the above accumulator still includes therein the part of the liquid, the lower wave cannot overcome the load acting upon the cylinder 10 to drive the pendulum, so that in this case, the energy absorption is completely precluded. In order to avoid this, it may be considered to remove the accumulators. Without accumulators, however, when a higher wave impinges against the pendulum, the energy absorption must be effected with a great amount of the hydraulic liquid at a remarkably high pressure only for one period of the high wave because of the relation of $W \propto H^2$, so that an apparatus having an unduly large capacity must be prepared.

According to the invention, when a high energy wave comes the pendulum, the pressure in the hydraulic circuit does not rise so high because the energy Ea stored in the accumulator is proportional to the square of the pressure $P_1$ of the liquid supplied to the hydraulic motor, that is $Ea \propto P_1^2$ or $P_1 \propto \sqrt{Ea}$. This energy is gradually consumed in the hydraulic motor.

As above described, the load acting upon the pendulum 107 from the cylinder 110 is given by the hydraulic pressure $P_1$. The pressure $P_1$ is a function of the volume V of the hydraulic liquid stored in the accumulator, so that the load acting upon the pendulum is a function of the absorbed energy level Ea.

The wave energy is not sufficiently converted into the hydraulic pressure energy unless a suitable magnitude of load is applied to the pendulum correspondingly to the wave energy level. For example, the conversion rate from the wave energy to the pressure energy will be lower when the constant B in the equation (10) is the infinity ($\infty$) or zero (0). The optimum value of B lies therebetween. As is clear from FIG. 5, however, it is very difficult to adjust the value of B at will. The invention of the present application solves this problem in the following manner.

The value of B is retained constant, while a radius $r_c$ (FIG. 4) of a rocking lever for driving the cylinder 110 by the pendulum 107 is made adjustable. With this arrangement, the load moment to be applied to the pendulum can be adjusted under a constant load of the cylinder 110 to meet the magnitude of the driving moment caused by waves.

As can be seen from the above description, the method and apparatus according to the invention can absorb the wave energy without difficulty to meet the variation in wave energy and convert it into electric power having less fluctuation with high efficiency, maintaining the merit of the prior invention of the Japanese Laid-open Patent Application No. 57-137,655.

Although the two hydraulic motors are depicted in FIG. 4, three or more hydraulic motors in addition to the above two motors may be provided and each the hydraulic motor is provided in its line with an accumulator as shown in FIG. 5. In this case, the hydraulic liquid from the cylinder 110 is supplied into the lines for the respective hydraulic motors successively in a predetermined order in synchronism with the rocking movement of the pendulum, and the lines which are now not supplied with the hydraulic liquid from the cylinder 110 are closed until they are again successively connected to the cylinder 110. In this manner the same effect as by the two hydraulic motors can be accomplished.

According to the invention, even if wave heights are relatively high, the maximum hydraulic pressure in the hydraulic system is maintained at a comparatively low level, so that the construction cost of the apparatus is low. Moreover, the hydraulic motors are actuated with beneficial efficiency because of less fluctuation of the hydraulic pressure. Accordingly, the low construction cost and improved operation efficiency are simultaneously achieved. Moreover, safety and reliability for the apparatus are high. The power generated by the apparatus according to the invention can be directly connected to the public power network. The generated electric power according to the invention is smoothed or not fluctuated notwithstanding the periodic variation of waves with high wave power generating efficiency irrespective of variation in wave height. Accordingly, the invention is very useful in practical use.

It is further understood by those skilled in the art that the foregoing description is that of preferred embodiments of the disclosed invention and that various changes and modifications may be made in the invention without departing from the spirit and scope thereof.

What is claimed is:

1. A method of generating electric power by wave force, comprising steps of transmitting movement of a wave receiving body driven by said wave force to a piston and cylinder assembly to produce hydraulic pulsation flow; and supplying said hydraulic pulsation flow in synchronism with rocking movement of said wave receiving body caused by said wave force successively into a plurality of hydraulic motors having respective accumulators connected thereto of a type wherein accumulated pressure and volume of the hydraulic flow are proportional to each other to drive one common generator through respective one-way clutches, while closing lines of the hydraulic motors which are not supplied with the flow, thereby eliminating periodic fluctuations of generated power output due to periodicity of wave energy and maintaining high wave activated power generation efficiency notwithstanding unevenness of wave heights.

2. In an apparatus for generating electric power by wave force including at least one caisson having a bottom plate, a back plate and sidewalls opening in an opposite side of said back plate and opening at least part of an upper portion of the caisson to form therein a water chamber, said caisson being arranged to form at least part of a breakwater, bank and the like facing to the sea, and a pendulum having a natural period in rocking substantially the same as periods of stationary wave surges of water caused in said water chamber and arranged in said caisson at a distance from said back plate one fourth of lengths of said stationary wave surges which rock said pendulum so as to absorb wave energy to convert it into electric or heat energy, the improvement comprising at least one double acting hydraulic piston and cylinder assembly whose piston is driven by said pendulum to discharge hydraulic liquid in extending and retracting said piston, a change-over valve actuated by pressure difference between cylinder chambers on both sides of said piston of said piston and cylinder assembly, a plurality of hydraulic motors driven by hydraulic liquid controlled by the actuation of said change-over valve to drive a common generator, and accumulators each provided in a line connecting said change-over valve and each said hydraulic motor, thereby generating electric power with the least fluctuation notwithstanding variation in wave force.

3. An apparatus as set forth in claim 2, wherein there is provided a rocking lever connecting said pendulum and said piston of the piston and cylinder assembly, whose rocking radius is made adjustable.

4. An apparatus as set forth in claim 2, wherein each said accumulator is a type wherein accumulated pressure and volume of the hydraulic liquid are proportional to each other.

5. An apparatus as set forth in claim 4, wherein said accumulator comprises a housing including therein a spring and a piston such that supplied hydraulic pressure urges said piston against a force of said spring so as to be accumulated in the accumulator.

6. An apparatus as set forth in claim 2, wherein an output shaft of each the hydraulic motor is provided with a pulley having a clutch built therein.

7. An apparatus as set forth in claim 2, wherein said generator is an AC synchronous or induction motor and connected to a public power network.

* * * * *